United States Patent
Nachtman et al.

[19]

[11] Patent Number: 5,868,924
[45] Date of Patent: Feb. 9, 1999

[54] WATER PURIFIER

[75] Inventors: Charles T. Nachtman; Chester E. Chomka; James R. Edwards, all of Dubuque, Iowa

[73] Assignee: Barnstead/Thermolyne Corporation, Dubuque, Iowa

[21] Appl. No.: 799,146

[22] Filed: Feb. 14, 1997

[51] Int. Cl.$^6$ .................................................. C32F 1/28
[52] U.S. Cl. ................. 210/85; 210/96.1; 210/117; 210/195.1; 210/195.2; 210/202; 210/203; 210/205; 210/266; 210/254; 210/290; 210/910
[58] Field of Search ................. 210/202, 203, 210/205, 266, 284, 290, 900, 117, 96.1, 195.1, 195.2, 196, 85, 136

[56] References Cited

U.S. PATENT DOCUMENTS

| | | | |
|---|---|---|---|
| 3,276,458 | 10/1966 | Iversen et al. | 210/900 |
| 3,770,625 | 11/1973 | Wallis | 210/36 |
| 3,870,033 | 3/1975 | Faylor et al. | 219/316 |
| 3,985,648 | 10/1976 | Casolo | 210/27 |
| 4,166,037 | 8/1979 | Montagnon | 210/275 |
| 4,276,177 | 6/1981 | Smith | 210/638 |
| 4,430,226 | 2/1984 | Hegde et al. | 210/638 |
| 4,548,716 | 10/1985 | Boeve | 210/652 |
| 4,622,133 | 11/1986 | Furuno | 210/96.2 |
| 4,851,122 | 7/1989 | Stanley | 210/501 |
| 4,868,127 | 9/1989 | Blades et al. | 436/146 |
| 4,876,014 | 10/1989 | Malson | 210/668 |
| 4,888,101 | 12/1989 | Cooper | 204/157.15 |
| 4,913,808 | 4/1990 | Haque | 210/93 |
| 4,944,875 | 7/1990 | Gaignet | 210/232 |
| 5,064,534 | 11/1991 | Busch et al. | 210/266 |
| 5,073,268 | 12/1991 | Saito et al. | 210/638 |
| 5,124,033 | 6/1992 | Ohmi et al. | 210/181 |
| 5,227,053 | 7/1993 | Brym | 210/143 |
| 5,259,972 | 11/1993 | Miyamaru et al. | 210/652 |
| 5,272,091 | 12/1993 | Egozy et al. | 436/146 |
| 5,275,957 | 1/1994 | Blades et al. | 436/133 |
| 5,302,356 | 4/1994 | Shadman et al. | 422/186.3 |
| 5,395,522 | 3/1995 | Melanson et al. | 210/202 |
| 5,573,662 | 11/1996 | Abe et al. | 210/188 |

OTHER PUBLICATIONS

*Activated Carbon, What it is, How it Works,* by Delthorn, et al., Water Technology, vol. 9, No. 8, pp. 26–29, Nov. 1986.

*MilliQ® UV Plus Water System*Millipore Corporation Technical Brief, Lit. No. TB053, Nov. 1991, 91–519.

ASTM Standards, Designation: D 1193–91 (published 1991), pp. 116–117.

Journal of Bitechnology 33 (1994) pp. 123–133, *The photocatalytic production of organic–free water for molecular biological and pharmaceutical applications* by Gerald Cooper, et al.

Meltzer, T.H., High Purity Water Preparation for the Semiconductor, Pharmaceutical and Power Industries. pp. 157–164. Tall Oaks Publ. 1993.

*Primary Examiner*—Peter A. Hruskoci
*Attorney, Agent, or Firm*—Wood, Herron & Evans, L.L.P.

[57] ABSTRACT

A water purifier which produces ultrapure water from a variety of feed sources. The feed source water may be potable tap, distilled, deionized, or water treated by reverse osmosis. The water is passed through a first purification media (30) and then through a chamber (34) where it is exposed to ultraviolet light in the presence of titanium dioxide. The water is then passed through a second purification media (38) to a dispensing valve (40). Operating the dispensing valve (40) provides ultrapure water from the purifier having a specific resistance of at least 18.0 megohm-cm and a TOC count of less than one ppb.

20 Claims, 2 Drawing Sheets

WATER PURIFIER

FIELD OF THE INVENTION

This invention relates to a water purifier and more particularly, to a water purifier that can provide the highest quality reagent grade water, that exceeds ASTM Type I standards, with a specific resistance of greater than 18.0 megohm-cm and a total organic carbon (TOC) content of less than one part per billion (ppb), from different feed water sources.

BACKGROUND OF THE INVENTION

With the increasing sophistication of scientific testing and analysis, the requirements for uncontaminated water for laboratory use has likewise increased. The purity of water is graded according to various standards, and generally accepted standards are published in the *Annual Book of ASTM Standards, Water and Environmental Technology, Standard Specifications for Reagent Water*, Vol. 11.01, 1996. Of current interest is the ASTM Type 1 Reagent Grade Water Standard which specifies the highest purity water which is used for high performance liquid chromatography (HPLC), gas chromatography, trace metal analysis by atomic absorption spectrometry, tissue culture, etc.

The majority of impurities in potable water are in the form of disassociated ionized inorganic mineral salts which carry an electrical charge; therefore, the presence of ionic contaminants in water is directly related to the electrical conductivity or resistivity of the water. Conductivity and its reciprocal, resistivity, are therefore standard variables by which the ionic purity of water is measured. Specific resistance is measured in units of ohm-cm at a compensated reference temperature of 25° C. Absolutely pure water has a theoretical specific resistance of 18.17 megohm-cm. (As will be appreciated, most resistivity meters read to 18.3 megohm-cm as an artifact of earlier theoretical R-25 calculations.)

Organic contaminants do not typically contain an ionic charge. Therefore, they cannot be detected by specific resistance measurements. To determine the organic content of water and other materials, TOC, HPLC, GC and GC/MS and other special instruments are used to detect the presence of low levels of specific organic compounds. Consequently, water used in these analyses should contain no more than a few ppb of total organic compounds.

Therefore, there is a continuing need to provide reagent grade water suitable for the most demanding laboratory protocols requiring low TOC reagents. Reagent grade water with lower TOC are or will be required to meet the increasingly lower detection level demands for HPLC, gas chromatography with mass spectrometry detection (GC-MS), TOC analysis and other emerging analytical instrument technologies. There is a further need for water particularly suited for reagent use in EPA test methods for detection of volatile organic compounds (VOC) in drinking water, as well as water suitable for routine inorganic laboratory protocols.

SUMMARY OF THE INVENTION

To satisfy the more stringent water purity requirements, the water purifier of the present invention provides high quality reagent grade ultrapure water with a TOC content of less than one ppb from a variety of feed water sources.

According to the principles of the present invention and in accordance with the preferred embodiments, water from a feed source flows through a first series of purification media for general pretreatment by removing organic compounds, ions and other interfering substances. The water then flows through a chamber where it is exposed to a titanium dioxide catalyst and ultraviolet light to purify the water to a TOC of less than one ppb. The water flows from the chamber to a second series of purification media, including a first layer of media selected from the group consisting of acid washed coconut shell activated carbon and synthetic bead activated carbon and a successive second layer of media selected from a group consisting of macroporous semiconductor grade mixed bed resin. An outlet of the second purification media is connected to an inlet of the first purification media to provide a recirculation path of the water through the purifier. The second purification media produce water with a resistivity greater than 18.0 megohm-cm, and that water is selectively discharged from the purifier by using a dispensing valve.

In one aspect of the invention where the feed water source has been conditioned by reverse osmosis or distillation, the first purification media include a first layer of bituminous grade acid washed granular activated carbon, a successive second layer of acid washed coconut shell granular activated carbon, and a successive third layer of a semiconductor grade high purity mixed bed resin.

In another aspect of the invention where the feed water source is deionized or is water that contains more than fifty percent (50%) weak ions by weight, the first purification media contain an intermediate layer between the above described first and second layers comprised of a chloride form macroporous strong base anion resin.

In a further aspect of the invention where the feed water source is a water feed containing fewer than fifty percent (50%) weak ions by weight, the above described first purification media further have, after the layer of acid washed coconut shell granular activated carbon, a successive layer of media selected from the group consisting of nuclear grade hydrogen form strong acid cation resin and semiconductor grade hydrogen form strong acid cation resin. In addition, there is a further successive layer of a mixture including a free base form weak base anion resin and media selected from the group consisting of a hydrogen form nuclear grade strong acid cation resin and semiconductor grade strong acid cation resin.

Therefore, the present invention has an advantage of permitting water from different feed water sources to be purified to a resistivity of greater than 18.0 megohm-cm with a TOC of less than one ppb. These and other objects and advantages of the present invention will become more readily apparent during the following detailed description taken in conjunction with the drawings herein.

DETAILED DESCRIPTION OF THE INVENTION

Figure 1:
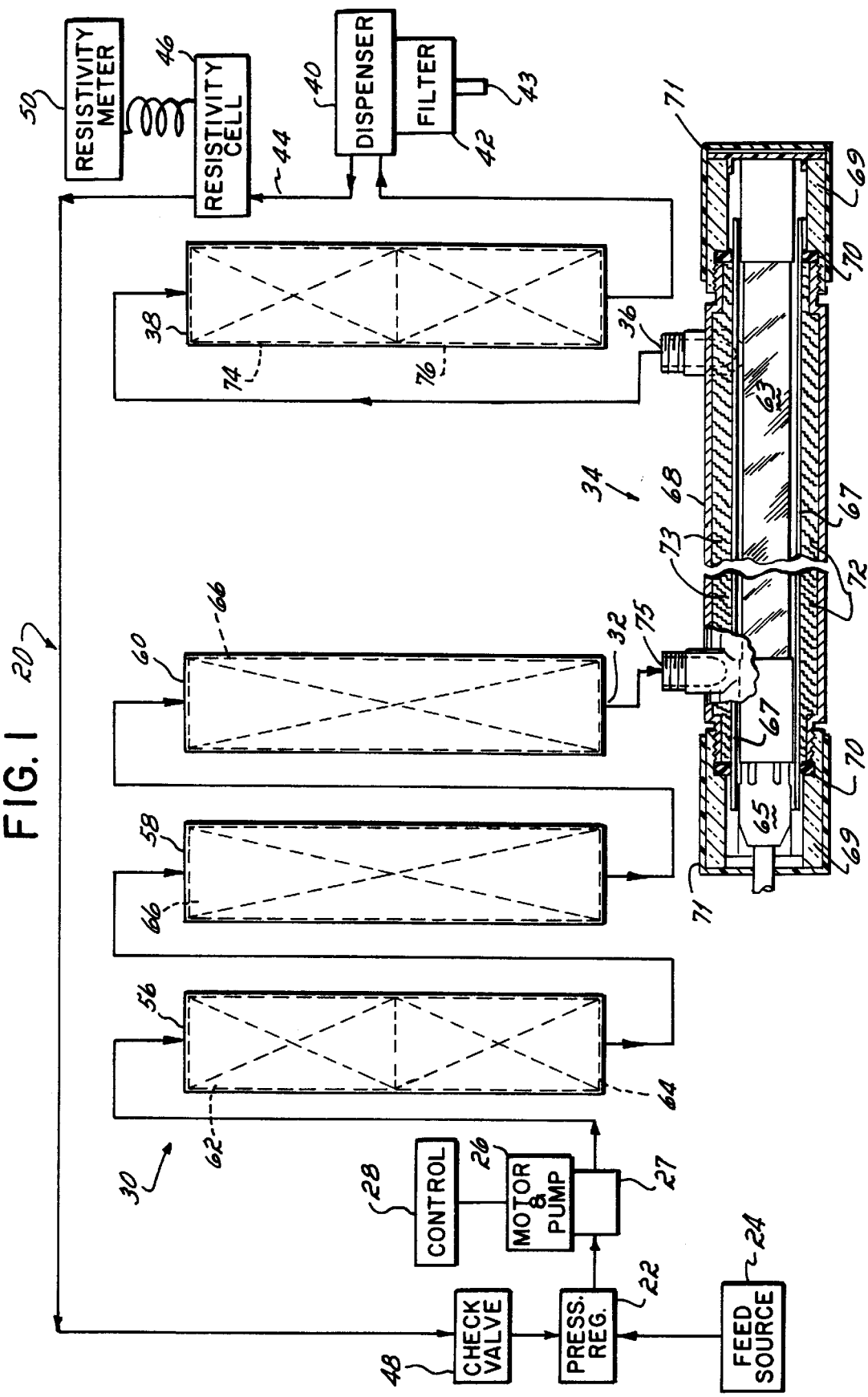
FIG. 1 is a schematic diagram of the water purifier in accordance with the principles of the present invention and including purification media for treating most reverse osmosis and distilled water feeds with a TOC.

Referring to FIG. 1, a water purifier 20 has a pressure regulator 22 at its input which is also connected to a feed water source 24. A motor and pump 26 are operated by a control 28 to pump the feed water through the first purification media 30. The first purification media 30 are designed and configured to remove non-volatile large molecular weight organic compounds, free chlorine and/or ozone, VOC compounds, including halogenated organic compounds, low molecular weight organic compounds, and all inorganic ions. The first purification media 30 not only removes large molecular weight organic compounds and other substance that could interfere with subsequent purification steps, but its purification media are selected to produce uniformly ultrapure water having a resistivity of at least 18.0 megohm-cm utilizing RO or distilled feed water. Preferably, as it passes through the first purification media 30, the water is always moving in a generally downward direction.

The water then passes from an outlet 32 of the first purification media 30 and through a catalytic chamber 34 within which the water is exposed to both titanium dioxide and UV radiation. As the water passes through the chamber 34, organic compounds are destroyed; and the water leaving the outlet 36 of the chamber 34 has a TOC level less than one ppb. However, the resistivity is reduced.

Water from an outlet 36 of the chamber 34 passes through second purification media 38 designed to repolish the water to at least 18 megohm-cm in very short rinse times with very low TOC addition. The second purification media 38 also removes the by-products of the ultraviolet oxidation process, new organic species, and carbonic acid without appreciably reintroducing more organic compounds back into the water. Water from outlet 39 of the second purification media 38 has a TOC content of less than one ppb and a resistivity of at least 18.0 megohm-cm and may be obtained from the purifier 20 by manually activating the dispenser valve 40, permitting water to flow through a final filter 42 and out of the dispenser 40. The final filter 42 is effective for removing submicron bacteria and particulates from the water. The dispenser 40 and filter 42 may be at any location, either proximate to or remote from the second purification media 38.

When not being dispensed, water flows through a recirculate path 44 through an in-line resistivity cell 46, through a check valve 48, back through the regulator 22 and back into the first purification media 30. The resistivity of the water may be determined at any time by viewing the resistivity meter 50. Preferably, the resistivity cell is located at the output of the purifier, so that it measures the resistivity of the water being dispensed. As with the dispenser 40, the resistivity cell may be conveniently installed at any location down stream of the last purification media. The purifier of FIG. 1 provides high quality reagent grade water that exceeds ASTM Type I, having a resistivity of greater than 18.0 megohm-cm and a TOC content of less than one ppb.

The water purifier of FIG. 1, and more specifically, the first purification media 30, have the advantage of being configurable to accommodate different purities of the feed water source 24. For example, for a feed water source 24 that has been pretreated with reverse osmosis or a distillation process and has a TOC equal to or less than 1 part per million ("ppm"), the first purification media 30 are preferably comprised of three different purification media housed in three cartridges 56, 58, and 60. Cartridge 56 is a down flow cartridge which has a first layer of purification media 62 that is a bituminous grade, acid washed 20×50 mesh, granular activated carbon. Acid washed carbons are used because they contain much lower soluble ionic material that will leach into the water being purified. By reducing ion leaching from the carbon, the ionic load to the ion exchange resins downstream is in turn reduced. This improves the operating capacity for the cartridge system relative to the feed water source as compared to a non-acid washed material.

The bituminous carbon bed is designed to remove mainly nonvolatile large molecular weight organic compounds from feed water sources. These compounds usually consist of humic and fulvic acids that are found in surface water as a result of biological decay. The bituminous carbon is also used for the efficient removal of free chlorine or ozone from the feed water source. Free chlorine may carry over in some reverse osmosis systems, and larger molecular weight organics may also be present from plumbing materials. The 20×50 mesh size is used to increase the efficiency of the cartridge by providing more carbon surface area per unit volume than the larger mesh carbons. This allows feed water contaminants to more rapidly diffuse into the carbon structure to promote adsorption and removal. This bed removes the listed potential reagent grade water interferences and protects downstream ion exchange resins from organic fouling and/or damage from chlorine or other oxidants.

The cartridge 56 contains a successive second layer 64 in contact with the water consisting of an acid washed, 20×50 mesh, coconut shell granular activated carbon. This second bed is designed to remove VOC, including halogenated compounds, from feed water sources; the second layer is located downstream of the bituminous carbon due to its relative inefficiency for removing free chlorine and to protect it from fouling by large molecular weight organic compounds. Such fouling will reduce or eliminate its ability to remove VOC. The VOC removed by this second layer of media are often synthetic and are found in the feed water as a result of pollution, or from PVC pipe cement and/or cleaners or other materials used in feed water plumbing. Chloroform may also be present as a by-product of the chlorination process used by municipal water authorities. Removing these compounds is important so that they do not interfere with laboratory examinations of drinking water or other important samples that contain VOC. The two layers of media 62, 64 are provided in the cartridge 56 in approximately equal amounts by volume. The amount of media can vary, depending upon the application and the optimal cross-sectional area for the particular flow rate selected and the cartridge size.

The second and third cartridges 58, 60 are filled with media 66 comprised of a semiconductor grade, high purity, mixed bed resin. The semiconductor grade mixed bed resin is comprised of 40% (volume/volume) gel type hydrogen form strong acid cation resin mixed with 60% (volume/volume) of a gel, strong base, Type I, hydroxide form anion resin. The 60/40% mixture provides a stoichiometric equivalent of cation and anion removal capacity. The cation resin typically has hydrogen ions attached to its structure and is capable of exchanging for other positively charged ions. The anion resin typically has hydroxyl groups attached to its structure and is capable of exchanging for other negatively charged ions. The resin 66 is designed to remove all ionic contaminants from the feed water source. It will also remove ions leached from the pretreatment carbons. Polar and ionic organic species will also adsorb to or exchange with this resin. The resin 66 provides the main operating ion exchange capacity for the purification system and will produce at least 18.0 megohm-cm water without reintroducing appreciable quantities of organic compounds. By placing this resin upstream of the chamber 34, only high purity water will enter the chamber during most of the cartridge life. This prevents loss of UV radiation efficiency from inorganic materials that may block or absorb UV radiation. Consequently, full use of the UV radiation in the chamber 34 is available for organic compound destruction.

The chamber 34 preferably includes a light source or lamp 63 providing light with a wavelength in the ultraviolet range of from approximately 185–300 nm. Current lamp technology provides up to about 7% of the lamp radiation at a wavelength of 185 nm. This provides the optimal UV radiation for organic compound destruction; and the lamp 63 is commercially available as Model No. GPH287T5VH-S400-CB from Voltarc Technologies, Inc. of Fairfield, Conn. If, and as, lamp technology improves, an increase in the percentage of 185 nm radiation from the lamps will improve the ability of the system to produce even lower TOC results. One end of the lamp 63 is plugged into a connector 65 which in turn is connected to a power supply (not shown) in a known manner. Up to 85% of the UV radiation from the lamp remains in the 250 to 260 nm wavelength range. This wavelength range provides substantial ability to destroy microbes which may develop in the system. The lamp 63 is encased in a quartz sleeve 67 that is commercially available from Corning, Inc. of Corning, N.Y. The quartz sleeve 67 is centrally mounted within a housing 68, preferably made of Type 304 ,304L, 316 or 316L stainless steel. The ends of the housing 68 are closed by nuts 69 that are preferably made of an inert material and are threadedly connected to the housing 68. O-rings 70 preferably made of a "VITON" or "TEFLON" material or other suitable material are used to seal the space between the quartz tube 67 and the housing 68. Vinyl caps 71 fit over and protect the nuts 69. Titanium pieces 72 having a layer of titanium dioxide on their outer surfaces are disposed in an annular volume forming an annular flow cavity 73 between the quartz tube 67 and the outer cylindrical wall of the housing 68. Preferably, titanium pieces 72 are strips or wire with a titanium dioxide layer and are coiled around the quartz sleeve at varying distances from the quartz sleeve. Therefore, as water flows through an inlet 75 and through the cavity 73, it is simultaneously exposed to UV light and titanium dioxide, with the effect of destroying organic compounds in the water. The catalytic action of the titanium dioxide in the cavity 73 provides for a more rapid destruction of organic compounds in solution due to the increased production of hydroxyl free radicals. This improves the efficiency of the UV system without increasing the size of the chamber. Preferably, the UV lamp 63 and flow chamber 73 are oriented horizontally for increased efficiency. In an alternate embodiment, more than one chamber may be used.

Within the flow chamber 73, organic compounds are destroyed in the following reactions: oxygen in water that is exposed to ultraviolet radiation is converted to ozone and/or hydrogen peroxide. Ozone and hydrogen peroxide can react further with water or oxygen to form hydroxyl radicals (OH'). The hydroxyl radicals then react with organic matter in water, resulting in the conversion of the organic matter to carbon dioxide and water ($CH_3OH + 6OH' \rightarrow CO_2 + 5H_2O$). Ultraviolet radiation additionally can cleave water molecules themselves to form hydroxyl radicals and hydrogen ($2H_2O + 185$ nm UV$\rightarrow H_2 + 2OH'$). However, including titanium dioxide in the chamber provides a catalytic mechanism for efficient production of hydroxyl radicals from water molecules. The increased efficiency causes an appreciable increase in the destruction of organic compounds in water even in the absence of dissolved oxygen. This increased efficiency in reducing total organic carbon renders this invention capable of producing reagent grade water with a TOC level less than one ppb.

Preferably, titanium dioxide is generated by subjecting titanium parts to high temperature, 800° C., in the presence of oxygen for 15–30 minutes. For manufacturing purposes, the time and temperature will be dictated more as a cleaning operation than as an oxide forming procedure. Time at and/or somewhat below the above temperature will destroy any machining lubricant contamination prior to assembly. The main formation of the oxide coating will occur as a result of continuous exposure of the titanium to oxygen and ultraviolet radiation during normal operation of the system. In order to evenly distribute the flow of water through the chamber 34, the inlet 75 is located off the centerline of the chamber 34 so that it is approximately tangential with one side of the housing 68, for example, the front side of the housing 68 as viewed in FIG. 1. Similarly, the outlet 36 of located off of the centerline of the chamber 34, so that it is approximately tangential with the opposite side of the housing 68, for example, the rear side of the housing 68 as viewed in FIG. 1.

The main by-products of the UV oxidation of organic compounds are carbon dioxide and water. Carbon dioxide dissolved in water produces carbonic acid. The production of carbonic acid from the oxidation process is proportional to the amount of organic contaminants destroyed during the process. Since carbonic acid dissociates in water, the specific resistance of the water will drop in proportion to the amount of carbonic acid produced. Further, the water is continuously flowing through the chamber 34 and, therefore, only a portion of the water is exposed to UV radiation at any given time. This results in incomplete destruction of organic compounds and can produce intermediate organic compounds instead of just water and carbon dioxide. The intermediate compounds formed may consist of organic ions, such as acetates and formates, that will also reduce the specific resistance of the water leaving the chamber 34. If these compounds remain in solution, they can interfere with laboratory protocols. Consequently, even though the TOC has been significantly reduced, the organic species may have changed. The production of intermediate organic compounds with the addition of carbonic acid results in water leaving the UV chamber at a specific resistance that is substantially below the ASIM requirement of 18.0 megohm-cm. To remove these by-products of UV oxidation and polish the water exiting the UV chamber, post-UV treatment is required. This requires a combination of purification media that remove the new organic species and carbonic acid without appreciably reintroducing more organic compounds back into the water. If large quantities of ozone are produced from oxygenated waters, a mechanism for removal of ozone is also needed to protect downstream polishing resins.

Water from the outlet 36 of the chamber 34 enters a down flow cartridge 38 having a first layer of purification media 74 consisting of either acid washed, 20×50 mesh, coconut shell activated carbon, or synthetic bead activated carbon. Any intermediate or halogenated organic compounds from the UV chamber 34 will be absorbed by this bed. Further, any organic compounds passing through the UV chamber that were not oxidized will also be adsorbed by the purification media 74. In addition, any ozone or peroxides generated in solution by UV radiation and dissolved oxygen will be removed by the carbon media 74. As previously described with respect to the media 62, 64, the media 74 protect downstream mixed bed resins from damage that could occur from these oxidizing agents. TOC will rise if resins are damaged.

The downflow cartridge 38 contains a successive second layer of purification medium 76 that is of a macroporous, semiconductor grade mixed bed resin. This mixed bed resin is designed to remove all organic ions passing through the carbon bed 74, as well as the carbon dioxide (carbonic acid) generated by the UV oxidation process. Any ions, such as chloride, released from halogenated organic compounds will also be removed by the mixed bed 76. This bed further removes all ionic materials that may leach from the carbon bed. The macroporous structure of the resin also renders the system capable of removing colloidal particles without reintroducing significant amounts of organic contaminants.

As a final media, many current systems use a 90% mixed bed resin with 10% synthetic carbon to achieve low TOC and maintain 18.0 megohm water. The 10% carbon fraction of the final media can provide interfering ions that standard resistivity meters may not detect. Similarly, the synthetic carbon that is part of the last purification medium increases the potential for low level inorganic ion interference in the product water. Carbons, synthetic or natural, contain a significant ionic content that will dissolve in water. Since the carbon makes up a portion of the last medium, ionic interference in the product water is likely. While the resistivity meters in most purification systems are not sensitive enough to detect this increase, using 100% mixed bed resin as the last medium eliminates this potential ion leaching problem.

Figure 2:
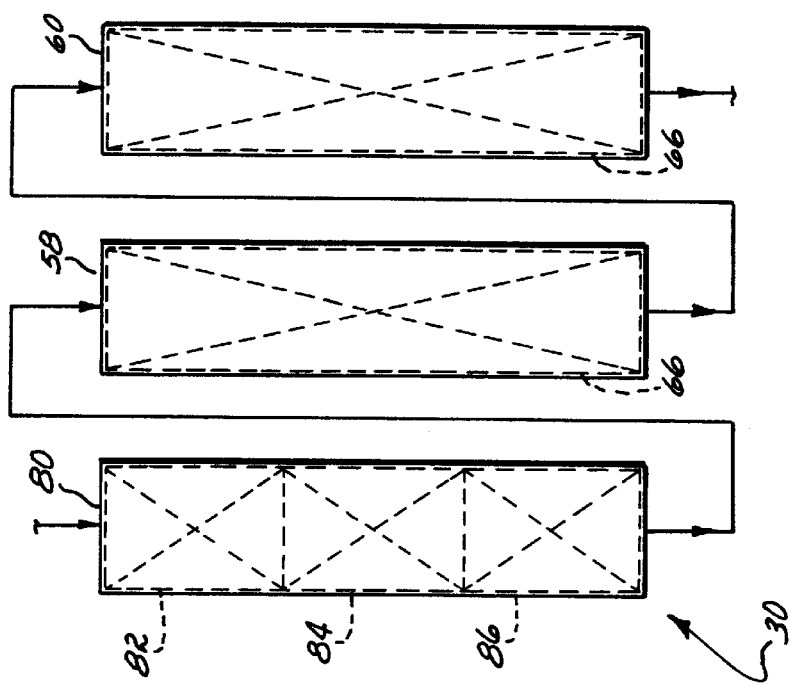
FIG. 2 is a schematic diagram of the first purification media for treating deionized and water feeds containing more than fifty percent (50%) weak ions.

FIG. 2 illustrates a different configuration of the first purification media 30, which is designed for use with either deionized feed water or potable tap water that contains more than fifty percent (50%) weak ions by weight with a TOC equal or less than 1.0 ppm (parts per million). For purposes of this description, weak ions are defined as any carbonate, bicarbonate, silicate, carbon dioxide or borate ions present in the feed water source. In this embodiment, the first purification media 30 include cartridges 58, 60 containing media 66 that are identical to that previously described with respect to cartridges 58, 60 of FIG. 1. However, in this embodiment, down flow cartridge 80 is used instead of the down flow cartridge 56. The down flow cartridge 80 contains a first layer of purification media 82 of a bituminous grade acid washed, 20×50 mesh, granular activated carbon that is identical to the purification medium 62 previously described. A second successive layer of purification media 84 is a chloride form macroporous strong base anion resin. The medium 84 is used to remove colloidal silica, iron, and aluminum bearing silicate colloids, as well as refractory organic colloids including humic and fulvic acids. Colloids are very slightly ionized, extremely small particles that may clog conventional filtration systems and may reduce the effectiveness of the ion exchange resin. Colloidal material is common to surface waters and central deionized water that may typically be supplied to this system. Therefore, the medium 84 prevents colloidal contaminants from clogging filters and interfering with the ion exchange process. This resin increases the capacity of the system for removal of large molecular weight organic compounds associated with tap water. By placing the colloid scavenging resin downstream from the bituminous carbon, the resin is protected from chlorine and other oxidant damage. The cartridge 80 contains a successive third layer of medium 86 of an acid washed 20×50 mesh coconut shell carbon that is identical to the medium 64 previously described.

Figure 3:
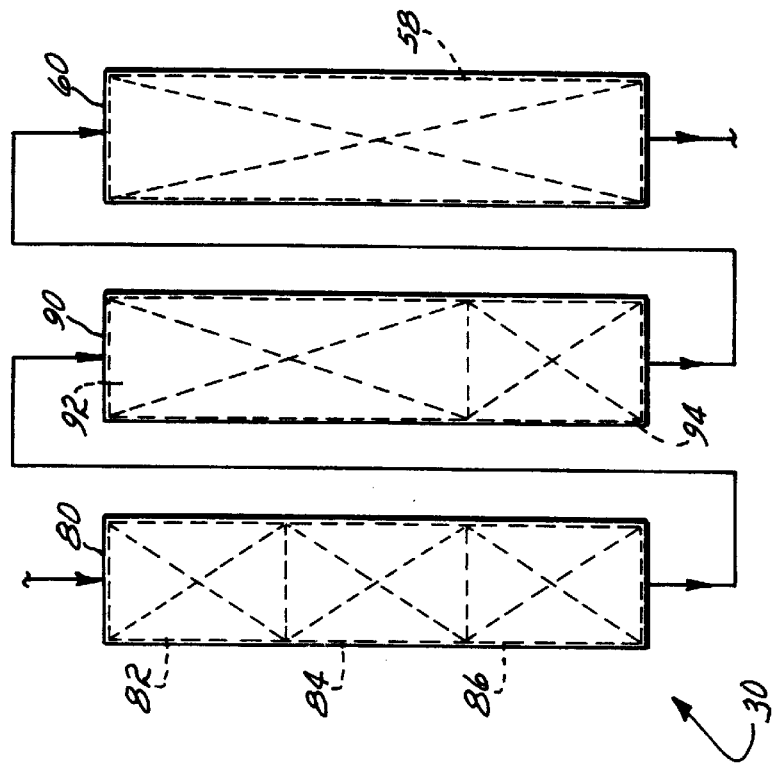
FIG. 3 is a schematic diagram of the first purification media for treating water feeds containing less than fifty percent (50%) weak ions.

FIG. 3 illustrates a third embodiment of the first purification media 30 that is designed for a potable tap water feed source that contains fewer than fifty percent (50%) weak ions by weight with a TOC equal to or less than 1 ppm. The purification media include down flow cartridges 60 and 80, which have been previously described with respect to FIGS. 1 and 2, respectively. In this embodiment, the down flow cartridge 58 of FIGS. 1 and 2 has been replaced by down flow cartridge 90. The cartridge 90 contains a first layer of purification media 92 of either a nuclear grade hydrogen form strong acid cation resin, or a semiconductor grade, hydrogen form, strong acid cation resin. The cartridge 90 contains a successive, second layer of purification media of twelve and one half percent (12.5%)/vol. of either hydrogen form nuclear grade strong acid cation resin, or semiconductor grade strong acid cation resin, and eighty seven and one half percent (87.5%)/vol. of a weak base anion resin. The 12.5% cation resin is used to capture sodium ions that may leak from the single cation bed located upstream. This cartridge 90 will increase the ion exchange capacity of the purification system by up to forty-five percent (45%).

Water first contacts the hydrogen form strong acid cation resin bed. Calcium, magnesium, and sodium ions, the major cations normally found in tap water, will exchange for hydrogen ions on the resin. Since the major cations will most likely be associated with major anions such as chloride, sulfate and carbonates, acids will be formed in the water (where R=resin, the reaction is RH+NaCl→RNa+HCl showing the conversion of sodium chloride to hydrochloric acid in solution). Water leaving the strong acid cation bed now contains a strong mineral acid that will be absorbed onto the weak base resin located downstream. In practice, essentially all of the divalent cations will be removed by the cation resin. Most of the sodium, a monovalent cation, will also be removed. A small amount of sodium leakage from the cation resin bed is expected because single bed ion exchange is not as efficient as mixed bed resin ion exchange. Strong acid and strong base resins are capable of producing higher quality water when mixed together as compared to two single beds run in sequence, due to the effects of competing ions in solution. As the mineral acidity is absorbed onto the weak base resin, there is less competition for the sodium ion. Therefore, a significant amount of sodium leakage is picked up in this bed.

In use, a prospective feed water source 24 is analyzed to determine its contaminants and therefore, which configuration of first purification media 30 is appropriate. The first purification media 30 are then assembled by selecting the appropriate cartridges as previously discussed. The feed water source 24 may be a batch water tank, a pressurized tap water source, or the output of a reverse osmosis, distillation or deionization process. The purifier 20 is connected to the feed water source and the control 28 is used to turn on the motor and pump 26 in a continuous recirculation mode. During the initial operation of the purifier 20, it may require from ten to twenty minutes for water from the feed source 24 to reach the desired specific resistance. During the initial start of the system with new cartridges, water may be run to drain for ten or twenty minutes to provide a several bed volume rinse and to bring the system to purity. This wets all materials and removes manufacturing by-products from the resins; and water having a resistivity of at least 18.0 megohm is usually achieved within this rinse time. In practice, the time required for the system to reach a TOC of less than 1.0 ppb TOC will vary with carbon wetting, the temperature of the feed water, feed water TOC and other non-controllable variables.

When the purifier 20 is not being used, the control 28 has a stand-by mode selection, which operates the motor and pump 26 in a stand-by mode. In stand-by mode, the motor and pump are operated to recirculate the water on an intermittent basis, for example, for ten minutes out of every hour. This maintains active ion exchange and organic destruction at least once out of every hour during idle periods and provides rapid recovery when the system is put in service. During normal use, the system is turned on and the water is recirculated through the purifier 20 until the resistivity meter 50 indicates that the a resistivity of the water is at least 18 megohm-cm. At that point, the dispenser valve 40 is operated to dispense the ultrapure water from the dispenser outlet 43. Normal operation of the system consists of turning the unit on at the beginning of a work day, allowing the system to circulate during working hours and putting the system in the stand-by mode for off hours.

While the present invention has been illustrated by the description of an alternative embodiment, and while the embodiments have been described in considerable detail, it is not the intention to restrict or in any way limit the scope of the appended claims to such detail. Additional advantages and modifications will readily appear to those skilled in the art. For example, it is preferred that the carbon media 62, 64 be placed as successive respective layers within the cartridge 56. However, as will be appreciated, mixing the carbon media 62, 64 into a single layer within the cartridge 56 also works very well. Such mixing, however, requires that the carbon be backwashed and handled wet. The handling, mixing, and storage of the mixed carbon increases the potential for bacterial contamination and also increases the cost of the cartridge.

The titanium dioxide catalyst is provided by titanium strips or wires 72 wrapped around the quartz tube 67. Alternatively, the titanium pieces or chunks may be located in the flow chamber 73, or the housing 68 may be constructed of titanium. While preferably the titanium is heated in an oven to provide an initial oxidation, the titanium dioxide layer can be initially formed insitu by circulating the water around pure titanium pieces inserted in the flow chamber 73. While the mesh sizes recited herein are preferred, other mesh sizes of purification media may be utilized depending on the flow rate requirements of the system.

As will be appreciated, a feed water source that is referred to as potable tap water is normally water that satisfies the EPA standards for drinking water. However, the water purifier described herein will function with water that does not meet those standards although the flow rate of ultrapure water produced and/or the life of the media may be reduced. Further, the feed water should preferably have a TOC equal to or less than 1 ppm, and in those situations in which the feed water does not meet that criteria, further pretreatment with filtration and/or activated carbon may be recommended. However, even if the TOC of the feed water is greater than 1 ppm, the water purifier described herein will produce ultrapure water with a TOC of less than 1.0 ppb, but the capacity and efficiency of its operation may be reduced.

The invention in its broadest aspects is therefore not limited to the specific details, representative image system and illustrative examples shown and described. Accordingly, departures may be made from such details without departing from the spirit or scope of applicant's general inventive concept.

What is claimed is:

1. A water purifier connected to a feed water source for providing ultrapure water having a specific resistance of at least 18.0 megohm-cm and a TOC of less than one ppb, the water purifier comprising:

first purification media disposed in a first housing having a pump inlet in fluid communication with a feed water source for water pretreatment and an outlet, the first purification media including a first layer of an acid-washed granular activated carbon;

a chamber, having an inlet in fluid communication with the outlet of the first housing for exposing the water simultaneously to titanium dioxide and UV light to purify the water by reducing the TOC to less than one ppb;

second purification media disposed in a second housing having an inlet in fluid communication with an outlet of the chamber and an outlet in fluid communication with the inlet of the first housing, the second purification media including:

a first layer selected from the group consisting of coconut shell activated carbon and synthetic bead activated carbon, and a second layer of macroporous semiconductor grade mixed bed resin; and a dispensing valve in fluid communication with an outlet of the second purification media for selectively dispensing ultrapure water having a specific resistance of at least 18.0 megohm-cm and a TOG of less than one ppb from the water purifier.

2. The water purifier of claim 1 wherein the first layer of activated carbon is a 20×50 mesh.

3. The water purifier of claim 1 wherein the dispensing valve includes a filter having a pore size in the range of approximately 0.1 to 0.2 micron for eliminating bacteria and removing particulates from the water dispensed from the water purifier.

4. The water purifier of claim 1 wherein the chamber is mounted in a generally horizontal direction.

5. The water purifier of claim 1 wherein the UV light is provided by a light source emitting light having a wavelength in the range of from approximately 185 nm to approximately 300 nm.

6. The water purifier of claim 5 wherein up to about 7% of the light emitted by the light source has a wavelength of approximately 185 nm.

7. The water purifier of claim 1 wherein the titanium dioxide is provided on surfaces of components of titanium disposed in the chamber.

8. The water purifier of claim 1 further comprising a pump having a pump inlet connected to the feed water source and a pump outlet connected to the first media for circulating water through the water purifier at a desired flow rate.

9. The water purifier of claim 8 further comprising a recirculation path connected between the outlet of the second purification media and the pump inlet.

10. The water purifier of claim 9 further comprising a check valve disposed in the recirculation path for preventing the flow of water from the pump inlet toward the outlet of the second purification media.

11. The water purifier of claim 9 further comprising a resistivity measuring device connected to be in contact with water exiting the outlet of the second purification media, the measuring device measuring and displaying the resistivity of the water being dispensed from the water purifier.

12. The water purifier of claim 11 wherein the resistivity device has a resistivity cell disposed in the recirculation path.

13. The water purifier of claim 9 wherein the dispensing valve is disposed in the recirculation path.

14. The water purifier of claim 1 wherein the feed source is distilled water or water treated by reverse osmosis and the first purification media comprises:

a first layer of a bituminous grade, 20×50 mesh, acid-washed, granular activated carbon;

a successive second layer of acid washed coconut shell, 20×50 mesh, granular activated carbon; and a successive third layer of semiconductor grade high purity mixed bed resin.

15. The water purifier of claim 1 wherein the feed source is deionized water or water containing more than 50% weak ions by weight and the first purification media comprise:
   a first layer of a bituminous grade, 20×50 mesh, acid-washed, granular activated carbon;
   a successive second layer of chloride form macroporous strong base anion resin;
   a successive third layer of acid washed coconut shell, 20×50 mesh, granular activated carbon; and
   a successive fourth layer of semiconductor grade high purity mixed bed resin.

16. The water purifier of claim 1 wherein the feed source is water containing less than 50% weak ions by weight and the first purification media comprise:
   a first layer of a bituminous grade, 20×50 mesh, acid-washed, granular activated carbon;
   a successive second layer of chloride form macroporous strong base anion resin;
   a successive third layer of acid washed, coconut shell, 20×50 mesh, granular activated carbon;
   a successive fourth layer selected from the group consisting of gel type semiconductor grade hydrogen form strong acid cation resin and nuclear grade hydrogen form strong acid cation resin;
   a successive fifth layer of a mixed bed resin comprised of:
      free base form weak base anion; and
      media selected from the group consisting of hydrogen form nuclear grade strong acid cation resin and hydrogen form semiconductor grade strong acid cation resin; and
   a successive sixth layer of semiconductor grade, high purity, mixed bed resin.

17. A water purifier connected to a feed water source for providing ultrapure water having a specific resistance of at least 18.0 megohm-cm and a TOC of less than one ppb, the water purifier comprising:
   first purification media disposed in a housing having an inlet in fluid communication with the feed water source and an outlet, the first purification media including a first layer of a bituminous grade, 20×50 mesh, acid-washed granular activated carbon;
   a chamber having an inlet in fluid communication with the outlet of the first purification media for exposing the water simultaneously to titanium dioxide and ultraviolet light to purify the water by reducing the TOC to less than one ppb;
   second purification media disposed in a housing having an inlet in fluid communication with the chamber and an outlet in fluid communication with the inlet of the housing of the first purification media, the second purification media providing water having a specific resistance of at least 18.0 megohm-cm and including:
      a first layer of activated carbon, and
      a second layer of macroporous semiconductor grade mixed bed resin, and
   a dispensing valve in fluid communication with an outlet of the second purification media for selectively dispensing ultrapure water from the water purifier having a specific resistance of at least 18.0 megohm-cm and a TOC count of less than one ppb.

18. A water purifier connected to a feed water source of either distilled water or water treated by reverse osmosis, the water purifier providing ultrapure water having a specific resistance of at least 18.0 megohm-cm and a TOC of less than one ppb and the water purifier comprising:
   first purification media disposed in a first housing having an inlet in fluid communication with a feed water source for water pretreatment and an outlet the first purification media including
      a first layer of a bituminous grade, 20×50 mesh, acid-washed, granular activated carbon;
      a successive second layer of acid washed coconut shell, 20×50 mesh, granular activated carbon; and
      a successive third layer of semiconductor grade high purity mixed bed resin.
   a chamber, having an inlet in fluid communication with the outlet of the first housing for exposing the water simultaneously to titanium dioxide and UV light to purify the water by reducing the TOC to less than one ppb;
   second purification media disposed in a second housing having an inlet in fluid communication with an outlet of the chamber and an outlet in fluid communication with the inlet of the first housing, the purification media including
      a first layer of 20×50 mesh, activated carbon selected from the group consisting of coconut shell activated carbon and synthetic bead activated carbon, and
      a second layer of macroporous semiconductor grade mixed bed resin; and
   a dispensing valve in fluid communication with the outlet of the second housing for selectively dispensing from the water purifier ultrapure water having a specific resistance of at least 18.0 megohm-cm and a TOC of less than one ppb.

19. A water purifier connected to a feed water source of either deionized water or water containing greater than 50% weak ions by weight, the water purifier providing ultrapure water having a specific resistance of at least 18.0 megohm-cm and a TOC of less than one ppb and the water purifier comprising:
   first purification media disposed in a first housing having an inlet in fluid communication with a feed water source for water pretreatment and an outlet the first purification media including
      a first layer of a bituminous grade, 20×50 mesh, acid-washed, granular activated carbon;
      a successive second layer of chloride form macroporous strong base anion resin;
      a successive third layer of acid washed coconut shell, 20×50 mesh, granular activated carbon; and
      a successive fourth layer of semiconductor grade high purity mixed bed resin;
   a chamber, having an inlet in fluid communication with the outlet of the first housing for exposing the water simultaneously to titanium dioxide and UV light to purify the water by reducing the TOC to less than one ppb;
   second purification media disposed in a second housing having an inlet in fluid communication with an outlet of the chamber and an outlet in fluid communication with the inlet of the first housing, the purification media including
      a first layer of 20×50 mesh, activated carbon selected from the group consisting of coconut shell activated carbon and synthetic bead activated carbon, and
      a second layer of macroporous semiconductor grade mixed bed resin; and
   a dispensing valve in fluid communication with the outlet of the second housing for selectively dispensing from the water purifier ultrapure water having a specific resistance of at least 18.0 megohm-cm and a TOC of less than one ppb.

20. A water purifier connected to a feed water source containing less than 50% weak ions by weight, the water purifier providing ultrapure water having a specific resistance of at least 18.0 megohm-cm and a TOC of less than one ppb and the water purifier comprising:

first purification media disposed in a first housing having an inlet in fluid communication with a feed water source for water pretreatment and an outlet the first purification media including
a first layer of a bituminous grade, 20×50 mesh, acid-washed, granular activated carbon,
a successive second layer of chloride form macroporous strong base anion resin,
a successive third layer of acid washed, coconut shell, 20X50 mesh, granular activated carbon,
a successive fourth layer selected from the group consisting of gel type semiconductor grade hydrogen form strong acid cation resin and nuclear grade hydrogen form strong acid cation resin,
a successive fifth layer of a mixed bed resin comprised of
free base form weak base anion, and
media selected from the group consisting of hydrogen form nuclear grade strong acid cation resin and hydrogen form semiconductor grade strong acid cation resin, and
a successive sixth layer of semiconductor grade, high purity, mixed bed resin;

a chamber, having an inlet in fluid communication with the outlet of the first housing for exposing the water simultaneously to titanium dioxide and UV light to purify the water by reducing the TOC to less than one ppb;

second purification media disposed in a second housing having an inlet in fluid communication with an outlet of the chamber and an outlet in fluid communication with the inlet of the first housing, the purification media including
a first layer of 20×50 mesh, activated carbon selected from the group consisting of coconut shell activated carbon and synthetic bead activated carbon, and
a second layer of macroporous semiconductor grade mixed bed resin; and a dispensing valve in fluid communication with the outlet of the second housing for selectively dispensing from the water purifier ultrapure water having a specific resistance of at least 18.0 megohm-cm and a TOC of less than one ppb.

* * * * *